(12) United States Patent
Scrimshaw et al.

(10) Patent No.: US 8,505,649 B2
(45) Date of Patent: Aug. 13, 2013

(54) POWER TOOL

(75) Inventors: David Leigh Scrimshaw, Beaumaris (AU); Benjamin Luke Van der Linde, Narre Warren South (AU); Paul Francis Connor, Caulfield North (AU)

(73) Assignee: Demain Technology Pty Ltd., Victoria (AU)

( * ) Notice: Subject to any disclaimer, the term of this patent is extended or adjusted under 35 U.S.C. 154(b) by 127 days.

(21) Appl. No.: 12/064,251

(22) PCT Filed: Apr. 26, 2006

(86) PCT No.: PCT/AU2006/000543
§ 371 (c)(1),
(2), (4) Date: Jun. 2, 2008

(87) PCT Pub. No.: WO2007/025353
PCT Pub. Date: Mar. 8, 2007

(65) Prior Publication Data
US 2009/0016834 A1    Jan. 15, 2009

(30) Foreign Application Priority Data
Aug. 29, 2005   (AU) ............................... 2005904707

(51) Int. Cl.
*B23Q 5/18*   (2006.01)
(52) U.S. Cl.
USPC ................ 173/176; 173/2; 173/180; 173/181
(58) Field of Classification Search
USPC ..................... 173/2, 176, 180, 181
See application file for complete search history.

(56) References Cited

U.S. PATENT DOCUMENTS

| 4,389,146 A |   | 6/1983 | Coder |
| 4,524,896 A | * | 6/1985 | Morrell, Jr. .................... 227/126 |
| 4,834,192 A |   | 5/1989 | Hansson |
| 4,858,230 A |   | 8/1989 | Duggan |
| 4,892,013 A |   | 1/1990 | Satoh |

(Continued)

FOREIGN PATENT DOCUMENTS

| DE | 29813077 U1 | 10/1998 |
| WO | WO02058893 A1 | 8/2002 |

OTHER PUBLICATIONS http://www.ehow.com/how_4897013_put-bit-dewalt-drill.html, Sep. 13, 2009.*
Office Action mailed Jun. 8, 2010 in U.S. Appl. No. 12/064,507.

(Continued)

*Primary Examiner* — Hemant M Desai
*Assistant Examiner* — Gloria R Weeks
(74) *Attorney, Agent, or Firm* — Faegre Baker Daniels LLP

(57) ABSTRACT

A power (1) tool including a driven member (15) that is operable to grip and drive at least one working element (4), drive means (25) operable to drive the driven member, the power tool being operable in either a working mode in which the driven member is driven to enable the working element to perform work, or an adjustment mode in which the driven member is adjusted to grip or release the working element, torque control means (7) controlling the torque produced by the drive means, the torque control means being operable to render the drive means inoperable when the torque exceeds a pre-determined level, the torque control means having an adjustment setting (17) which must be selected to enable the power tool to operate in an adjustment mode whereby the adjustment setting corresponds to a relatively low level of torque.

38 Claims, 9 Drawing Sheets

(56) References Cited

U.S. PATENT DOCUMENTS

| | | | |
|---|---|---|---|
| 5,195,760 A * | 3/1993 | Wheeler et al. | 279/60 |
| 5,277,527 A | 1/1994 | Yokota et al. | |
| 5,284,217 A | 2/1994 | Eshghy | |
| 5,657,417 A * | 8/1997 | Di Troia | 388/829 |
| 5,685,549 A * | 11/1997 | Yang | 279/64 |
| 6,045,303 A * | 4/2000 | Chung | 408/124 |
| 6,062,114 A * | 5/2000 | Rahm | 81/473 |
| 6,516,896 B1 | 2/2003 | Brookshar et al. | |
| 6,536,536 B1 * | 3/2003 | Gass et al. | 173/2 |
| 6,598,684 B2 * | 7/2003 | Watanabe | 173/2 |
| 6,687,567 B2 * | 2/2004 | Watanabe | 700/168 |
| 6,834,730 B2 * | 12/2004 | Gass et al. | 173/2 |
| 6,836,614 B2 | 12/2004 | Gilmore | |
| 6,892,827 B2 * | 5/2005 | Toyama et al. | 173/48 |
| 6,913,087 B1 | 7/2005 | Brotto et al. | |
| 6,945,337 B2 | 9/2005 | Kawai et al. | |
| 7,036,703 B2 | 5/2006 | Grazioli et al. | |
| 7,124,839 B2 * | 10/2006 | Furuta et al. | 173/104 |
| 7,410,006 B2 | 8/2008 | Zhang et al. | |
| 7,410,007 B2 * | 8/2008 | Chung et al. | 173/48 |
| 2003/0196824 A1 * | 10/2003 | Gass et al. | 173/131 |
| 2006/0186612 A1 * | 8/2006 | Puzio | 279/62 |
| 2009/0200053 A1 | 8/2009 | Scrimshaw et al. | |

OTHER PUBLICATIONS

Response (Amendment) filed Sep. 3, 2010 in U.S. Appl. No. 12/064,507.

Notice of Allowance mailed Nov. 26, 2010 in U.S. Appl. No. 12/064,507.

* cited by examiner

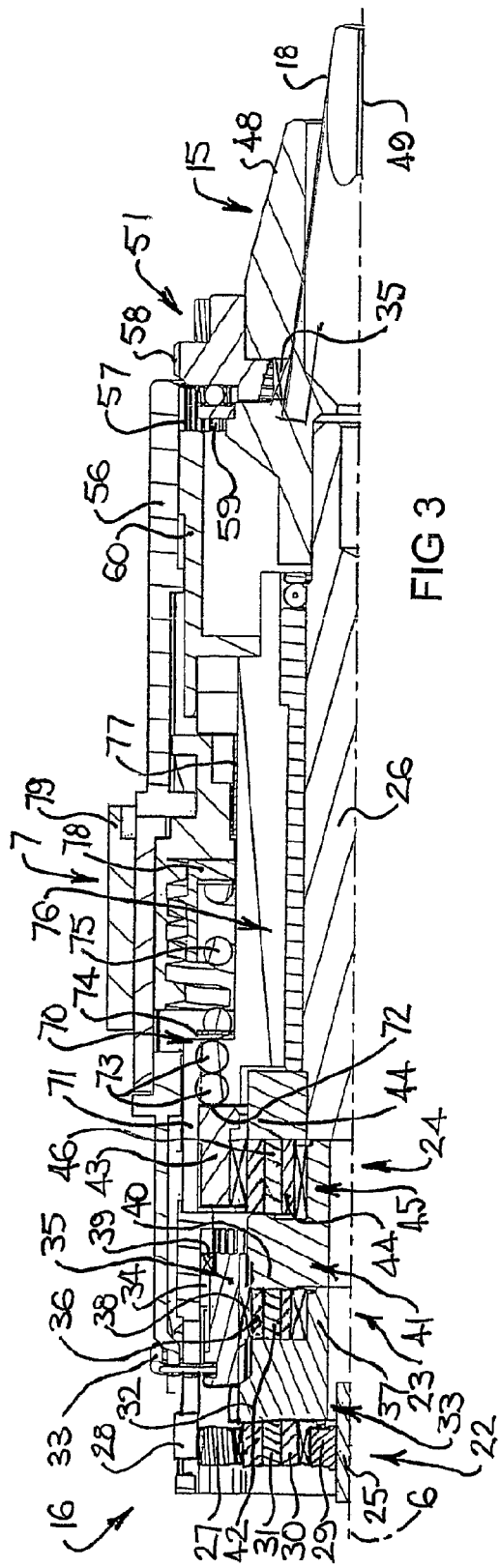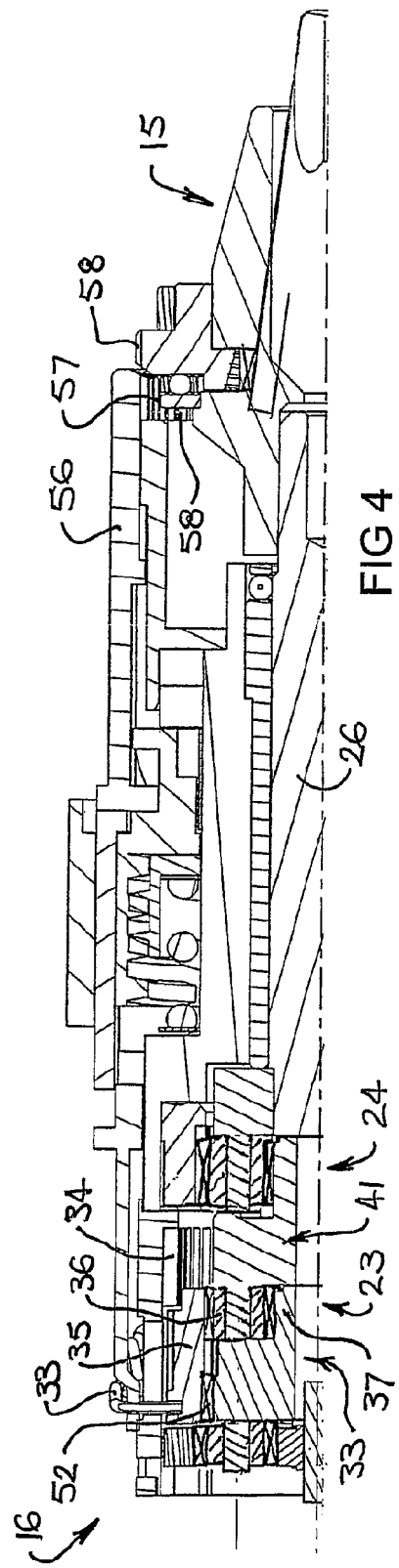

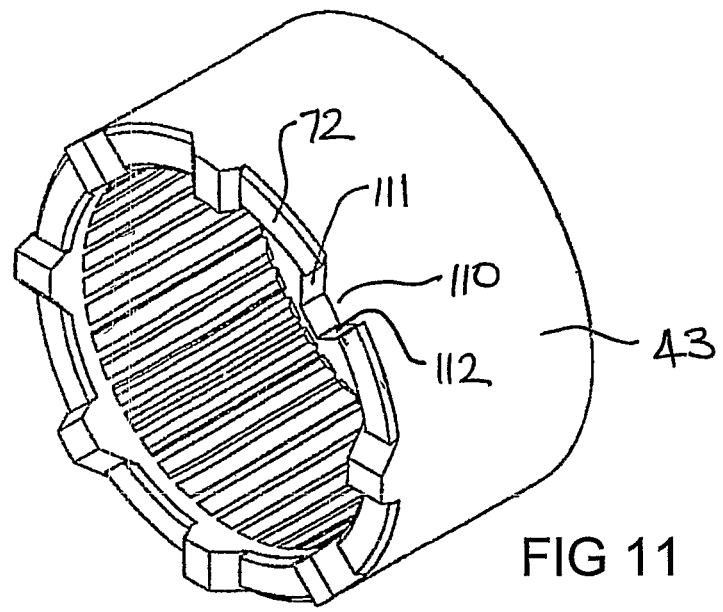
FIG 11
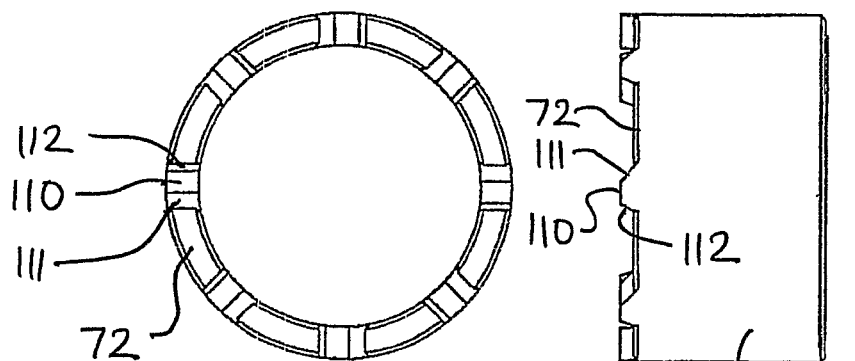
FIG 12
FIG 13

POWER TOOL

CROSS-REFERENCE TO RELATED APPLICATIONS

This is a U.S. National Phase Patent Application based on International Patent Application Serial No. PCT/AU2006/000543 filed on Apr. 26, 2006, the disclosure of which is expressly incorporated by reference herein.

FIELD OF THE INVENTION

This invention relates to power tools of the kind having a drive means driving a driven member which is adapted to releasably hold a working element. More specifically, the power tool is operable in a working mode to drive the working element and in an adjustment mode to grip or release the working element. A power drill is one form of power tool to which the invention is applicable and it will be convenient to hereinafter describe the invention with particular reference to power drills. It should be appreciated however that the invention has wider application being applicable to any power tool in which the working element is used to cut, shape or otherwise treat a workpiece or fastener associated with a workpiece.

BACKGROUND OF THE INVENTION

Conventional power drills typically have a driven member including a three jaw chuck which grips a working element such as a drill bit or screw driver head or the like. The chuck jaws are adjustable, normally by rotating an adjustment nut relative to the chuck body. In some case, the nut is rotated using a key, in other cases the user supplies a resistance force by gripping the nut while power is supplied to rotate the chuck body. More recently the applicant has designed a power drill having a locking sleeve that selectively engages the nut to provide the resistance force.

The locking sleeve has been found to be particularly effective in resisting the force produced by the drive means to grip the working element in the chuck jaws. However, the applicant has appreciated that if too much force is applied to the jaws it may damage or even crush the working element or break the jaws.

The above discussion of documents, acts, materials, devices, articles and the like is included in this specification solely for the purpose of providing a context for the present invention. It is not suggested or represented that any of these matters formed part of the prior art base or were common general knowledge in the field relevant to the present invention as it existed in Australia before the priority date of this application.

It is an object of this invention to provide a power tool that is convenient to use. It is a further object of the invention to provide a power tool having means to drive gripping jaws of the driven member to efficiently and safely grip a working element. It is a further object of this invention to provide a power tool that allows the user to control the torque supplied to the gripping jaws to protect elements of the power tool and the working element.

SUMMARY OF THE INVENTION

According to this invention there is provided a power tool including a driven member that is operable to grip and drive at least one working element, drive means operable to drive the driven member, the power tool being operable in either a working mode in which the driven member is driven to enable the working element to perform work, or an adjustment mode in which the driven member is adjusted to grip or release the working element, torque control means controlling the torque produced by the drive means, the torque control means being operable to render the drive means inoperable when the torque exceeds a pre-determined level, the torque control means having an adjustment setting which must be selected to enable the power tool to operate in an adjustment mode whereby the adjustment setting corresponds to a relatively low level of torque.

In a first preferred embodiment the power tool includes a mode selector operable to switch between work and adjustment modes of operation when the torque control means is in the adjustment setting only. In a second preferred embodiment the power tool automatically adopts an adjustment mode when the adjustment setting is selected on the torque control means.

It is preferred that the torque control means be operable to set a range of torque settings corresponding to a range of levels of torque.

It is preferred that the driven member include a body part and an adjustment part, the body part when driven by the drive means is rotated about a longitudinal axis, when in an adjustment mode the body part is rotated relative to the adjustment part to grip or release the working element, and the body part and adjustment part move together when in the working mode. It is preferred that the power tool include locking means operable to engage the adjustment part to thereby enable the body and adjustment parts to rotate relative to one another when the power tool is in the adjustment mode of operation. It is preferred that the locking means include a locking sleeve being movable in a longitudinal direction to engage with or disengage from the adjustment part. It is preferred that the gear assembly be configured to permit the drive means to operate in either a high or low speed. It is further preferred that the locking means be associated with the gear assembly so as to be operable when the drive means is in the low speed only.

It is preferred that the torque control means includes an annular member being rotatable about the longitudinal axis through a range of positions corresponding to the range of torque settings, the annular member being associated with the locking means such that the locking means is operable only when the annular member is in an adjustment position which corresponds to the adjustment setting. In the first preferred embodiment the user can move the locking ring to engage the adjustment part only when the annular member adopts the adjustment position. In the second preferred embodiment the locking ring is automatically moved to engage the adjustment part when the annular member adopts the adjustment position It is preferred that the drive means include a motor and gear assembly, wherein the gear assembly engages a shaft connected to the body part of the driven member and a geared slip ring of the torque control means, wherein when operable the drive means rotates the shaft and when rendered inoperable by the torque control means rotates the geared slip ring.

Preferably, when the power tool is in the adjustment mode and the drive means rotates in a direction for gripping the working element the torque control means renders the drive means inoperable at a relatively lower torque level and when the drive means rotates in a direction for releasing the working element the torque control means renders the drive means inoperable at a relatively higher torque level. An advantage of this embodiment is that it may provide that a greater amount of torque is applied for releasing the working element than for gripping the working element and thus may provide that the chuck jaws will release the working element and not become jammed.

Preferably, the torque control means includes a geared slip ring having an annular surface with spaced apart casselations defining cups therebetween, each casselation having two surfaces inclined to a substantially different degree relative to the annular surface of the geared slip ring for when the drive means rotates in the direction for gripping the working element the less inclined casselation surface engages a compression means and provides for a relatively less amount of torque required to overcome a given compressional force applied by the compression means to render the drive means inoperable and for when the drive means rotates in the direction for releasing the working element the more inclined casselation surface engages the compression means and provides for a relatively greater amount of torque required to overcome a given compressional force applied by the compression means to render the drive means inoperable.

More preferably, the compression means includes ball bearings that are movable in an axial direction relative to the geared slip ring and are urged by a compressional spring into engagement with the cups and the casselations on the annular surface of the geared slip ring wherein when the drive means rotates in the direction for gripping the working element the less inclined casselation surfaces engage the ball bearings and requires a relatively less amount of torque to urge the ball bearings in an axial direction to overcome a given compressional force applied by the compressional spring to render the drive means inoperable and when the drive means rotates in the direction for releasing the working element the more inclined casselation surfaces engage the ball bearings and requires a relatively greater amount of torque to urge the ball bearings in an axial direction to overcome a given compressional force applied by the compressional spring to render the drive means inoperable.

It is preferred that the power tool is a hand held power drill. The power tool preferably includes a power source. The power source is preferably in the form of a rechargeable battery, detachable from the power tool. Alternatively the power source could be an AC power source It will be convenient to hereinafter describe the invention in greater detail by reference to the accompanying drawings showing one example embodiment of the invention. The particularity of the drawings and the related detailed description is not to be understood as superseding the generality of the preceding broad description of the invention.

FIG. 3 is a diagrammatic illustration of the gear assembly of a first preferred embodiment when the mode selector has been operated to select low speed mode.

FIG. 4 is a diagrammatic illustration of the gear assembly of a first preferred embodiment when the mode selector has been operated to select high speed mode.

FIG. 11 is an isometric view of the geared slip ring according to a third preferred embodiment.

FIG. 11 is a top view of the geared slip ring of FIG. 11.

FIG. 12 is a side view of the geared slip ring of FIG. 11.

DETAILED DESCRIPTION

Figure 1:
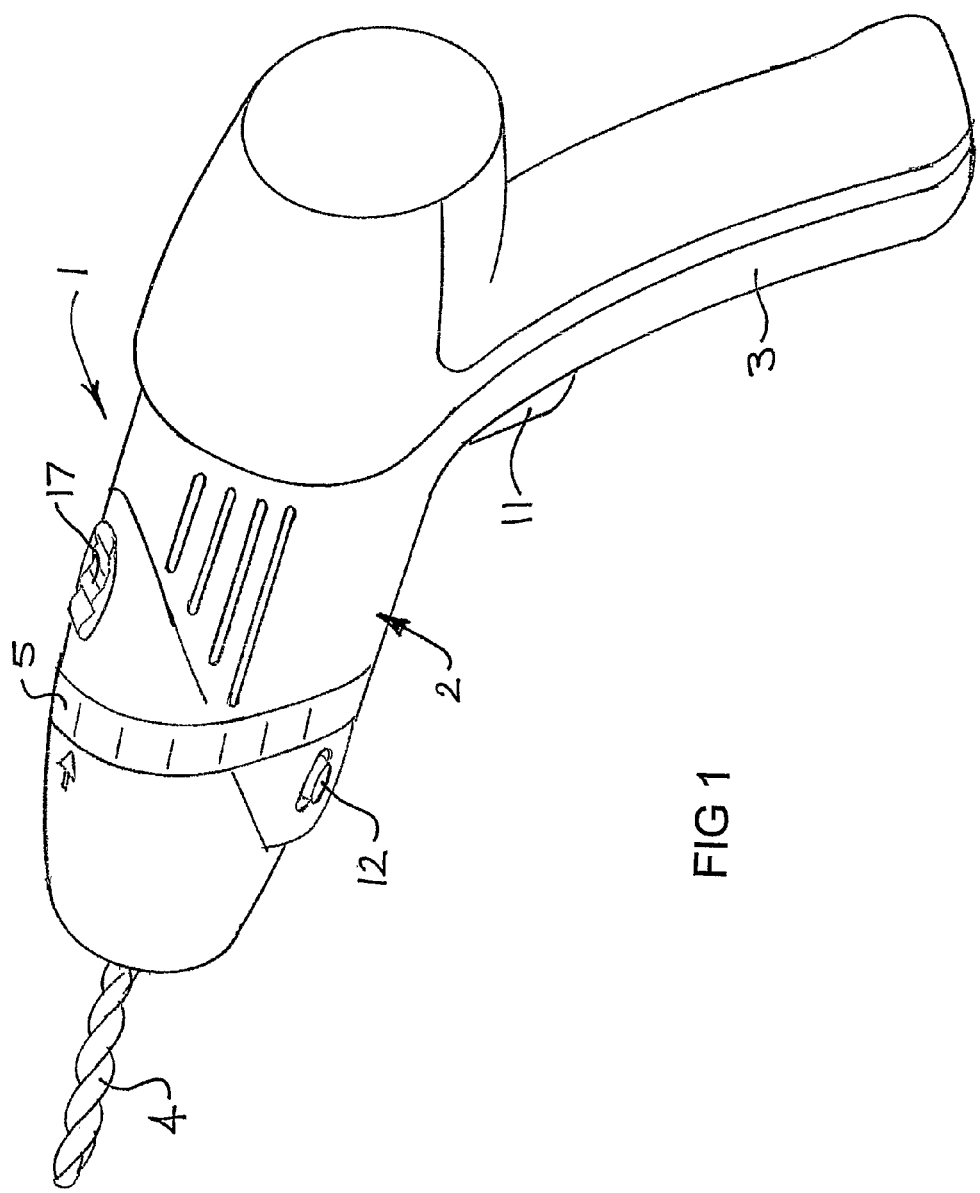
FIG. 1 illustrates in diagrammatic form a first preferred embodiment of the power tool to which the invention is applicable.

FIG. 1 of the drawings shows one form of portable power drill 1 to which the invention is applicable, but as previously stated the invention is applicable to other types of power tools including non-portable power tools. The drill shown in FIG. 1 incorporates an example embodiment of the invention. The drill, as shown in FIG. 1, includes a body 2 having a pistol grip 3 at the back end thereof. A working element 4 is illustrated extending from a front end of the drill 1. The drill 1 includes numerous features which are best described with reference to illustrations of the inner workings of the tool. These features are actuated by elements on the exterior of the power tool and whilst they will be described in detail later in the specification, FIG. 1 illustrates a trigger 11 on the pistol grip 3, a mode selector 17, a torque setting selector 5 and a directional switch 12.

Figure 2:
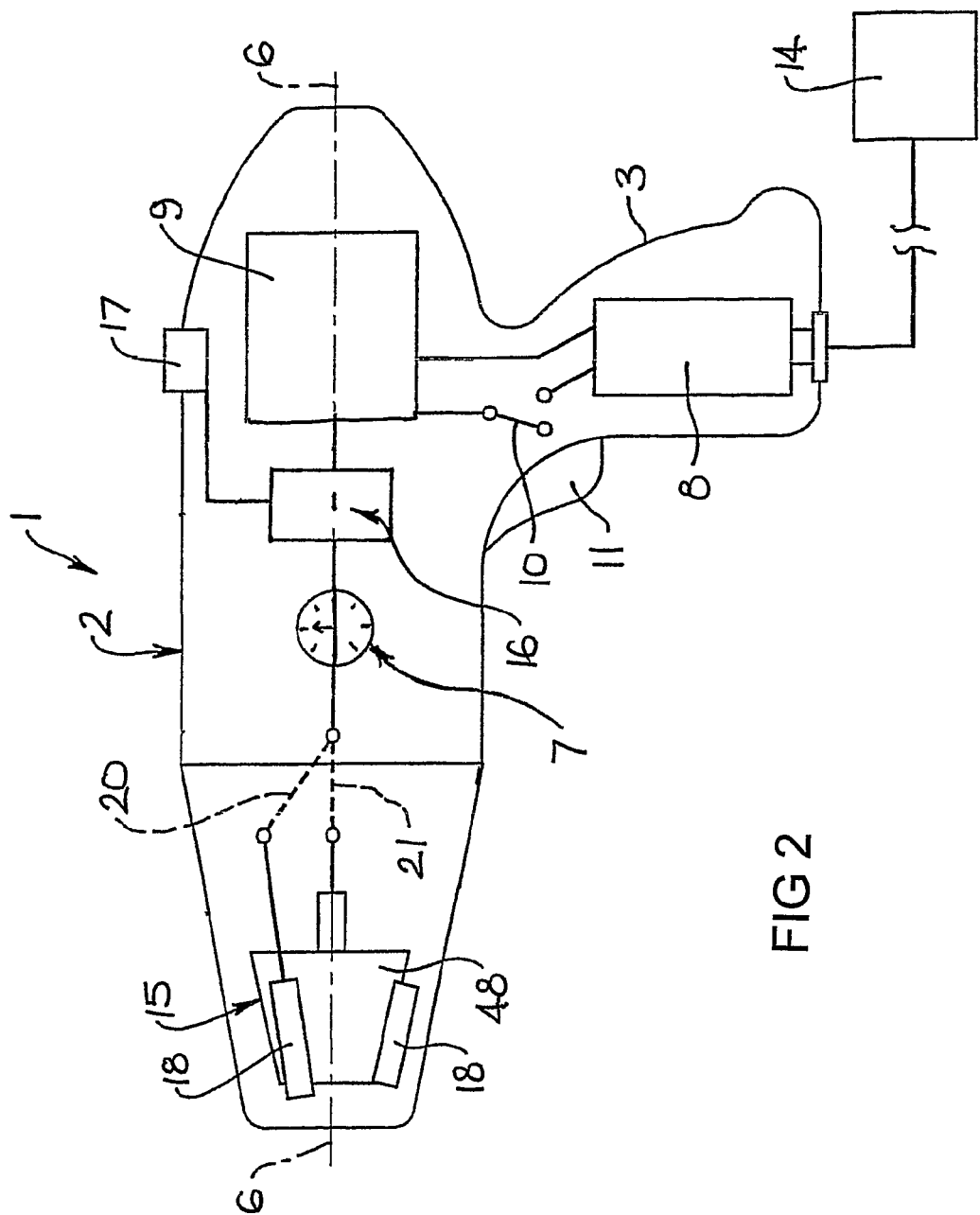
FIG. 2 is a diagrammatic illustration of the power tool from FIG. 1 illustrating some of the features.

FIG. 2 is a diagrammatic illustration of one particular arrangement of the drill 1. In the arrangement illustrated a battery 8 is located within the pistol grip 3, however it should be appreciated that the battery 8 may be located elsewhere within the drill 1. The battery 8 is connected to the motor 9 through a suitable switch 10. The switch 10 being opened and closed through operation of the trigger 11 illustrated from FIG. 1. A lock button (not shown) may be operable to releasably hold the trigger in the switch closed position. Such trigger locks are well known and do not require further description in this specification.

Alternatively, if desired the motor may be operated by direct connection to an AC power supply (not shown), or it may be operated by connection to an AC power supply through a DC rectifier (not shown).

Referring still to FIG. 2, the drill includes a driven member including a three jaw chuck 15 located within the body 2 of the power drill 1, the driven member being connectable with the motor 9 through a gear assembly 16. It is preferred that the mode selector 17 be operable to enable the drill 1 to operate in any one of three modes. In one of those modes (the adjustment mode) the motor 9 is operable to adjust the position of the chuck jaws 18 relative to body part or chuck head 48 to grip a the working element 4 (FIG. 1). The jaw adjustment connection is illustrated diagrammatically in FIG. 2 by the broken line 20. In each of the other two modes (the drive modes) the gear assembly 16 connects the motor 9 to the chuck 15 in a manner such that the chuck together with the working element 4 (FIG. 1) can be driven (rotated about longitudinal axis 6) to perform a drilling/machining operation. In one of the drive modes the chuck 15 is rotated at a relatively slow speed, and it is rotated at a relatively high speed in the other drive mode. The chuck drive connection is illustrated diagrammatically in FIG. 2 by the broken line 21.

FIG. 2 also illustrates torque control means 7 associated with the gear assembly 16 and the driven member 15. The torque control means 7 is operable to control the level of torque produced by the drive means 9. The torque control means 7 has a number of settings corresponding to a range of levels of torque. The settings are selected by manipulation of the torque selector located on the exterior of the body 2 of the power tool 1, referred to previously with reference to FIG. 1. One of the settings (adjustment setting) sets the level of torque at a relatively low level. Once in the adjustment setting the mode selector 17 is operable to select the adjustment mode, which also corresponds to a low speed.

Figure 5:
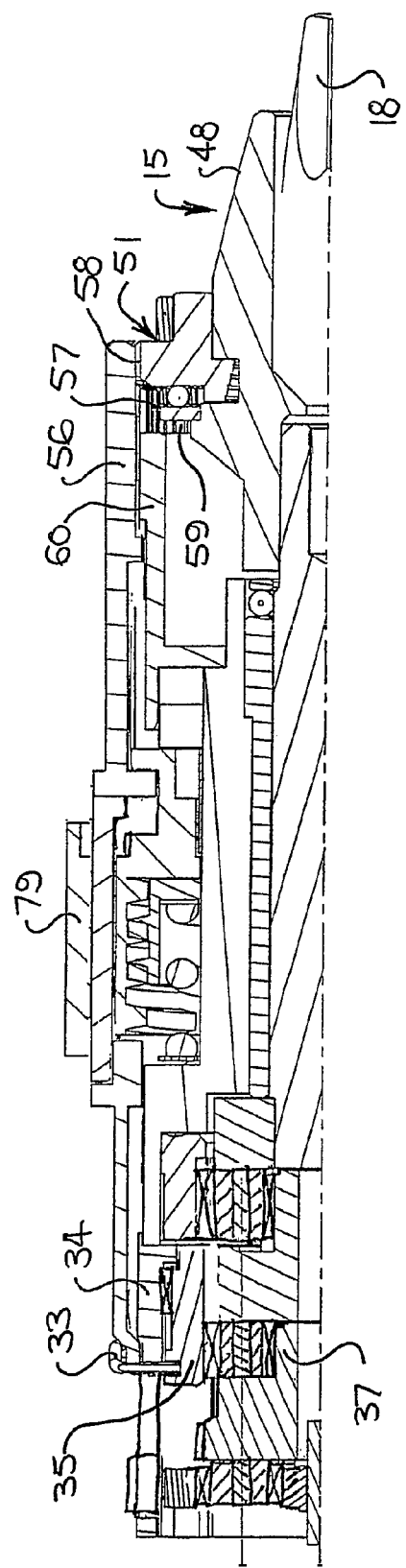
FIG. 5 is a diagrammatic illustration of the gear assembly of a first preferred embodiment when the mode selector has been operated to select adjustment mode.

FIG. 3 illustrates amongst other things one form of gear assembly 16 suitable for use in the drill 1. Other forms of gear assembly may also be suitable. It should be noted that for ease of description only the upper half of gear assembly 16, torque control means 7 and driven member 15 are shown in FIGS. 3, 4 and 5. The assembly 16 includes three gear systems, a first input system 22, a second input system 23, and an output system 24. Each of the input systems 22 and 23 is connected to the input shaft 25 through which the motor 9 is connected to the gear assembly 16. The output system 24 is connected to the output shaft 26, which forms part of the connection between the input shaft 25 and the chuck 15.

The first input system 22 includes a ring gear 27 fixed to a body 28 of the gear assembly 16, which is in turn connected to the drill body 2 (not shown in FIG. 3). The input system 22 also includes sun gear 29 that is rotatable with the input shaft 25, and three planet gears 30, each of which meshes with both the ring gear 27 and the sun gear 29. Each planet gear 30 is rotatably mounted on a respective spindle 31 arranged parallel to the axis 6, and each spindle 31 is connected to a flange 32 of a first transfer member 33. The transfer member 33 is mounted for rotation about the axis 6, and forms part of a connection between the input systems 22 and 23. It will be apparent that other means could be adopted to connect the systems 22 and 23.

The second input system 23 includes a first ring gear 34 fixed to the body 28, a geared slip ring 35 that is moveable relative to the body 28 in the direction of the axis 6, three planet gears 36, and a sun gear 37 fixed to the member 33. Each planet gear 36 meshes with the sun gear 37 and the inner teeth 38 of the ring gear 35, and outer teeth 39 of the geared slip ring 35 mesh with the fixed ring gear 34 in the mode of operation as shown by FIG. 3. Each planet gear 36 is connected to the flange 40 of a second transfer member 41 through a spindle 42 on which the planet gear 36 is rotatably mounted (FIG. 3). The member 41 is mounted for rotation about the axis 6. The input system 23 is thereby connected to the output system 24, but other arrangements could be used for that purpose.

The output system 24 includes a geared slip ring 43 associated with the body 70 of the torque control means 7, three planet gears 44, and a sun gear 45 that forms part of or is connected to the transfer member 41. Each planet gear 44 meshes both with the ring gear 43 and the sun gear 45. The output system 24 can be connected to the output shaft 26 in any appropriate manner. In the particular arrangement shown, each planet gear 44 of the output system 24 is connected to the output shaft 26 so as to transmit drive to that shaft. For that purpose, each planet gear 44 may be rotatably mounted on a respective spindle 46, each of which is connected to a flange 47 secured to the shaft 26. Other drive arrangements could be adopted.

Referring initially to FIG. 3, the body 70 of the torque control means is connected to the body 28 of the gear assembly 16. The geared slip ring 43 is located within a housing 71 of the body 70. The geared slip ring 43 includes a plurality of cups 72 located on an annular surface thereof, each cup 72 receiving one of a pair of ball bearings 73 located within the housing 71. The ball bearings 73 are located in grooves (shown in FIG. 7 as 93) formed in an inner radial surface of the housing 71. The other of each pair of ball bearings 73 protrude in part through apertures 74 in an radial wall of the housing 71. The protruding part of each ball bearing 73 is engaged by a compressional spring 75 surrounding a shaft 76 extending from the housing 71. The shaft 76 illustrated has four ribs 77 extending axially on an outer surface thereof, the ribs 77 providing a guide for a slide ring 78 which is movable axially of the shaft 76. The slide ring 78 has a threaded outer radial surface which engages a threaded inner radial surface of an annular member 79.

Figure 6:
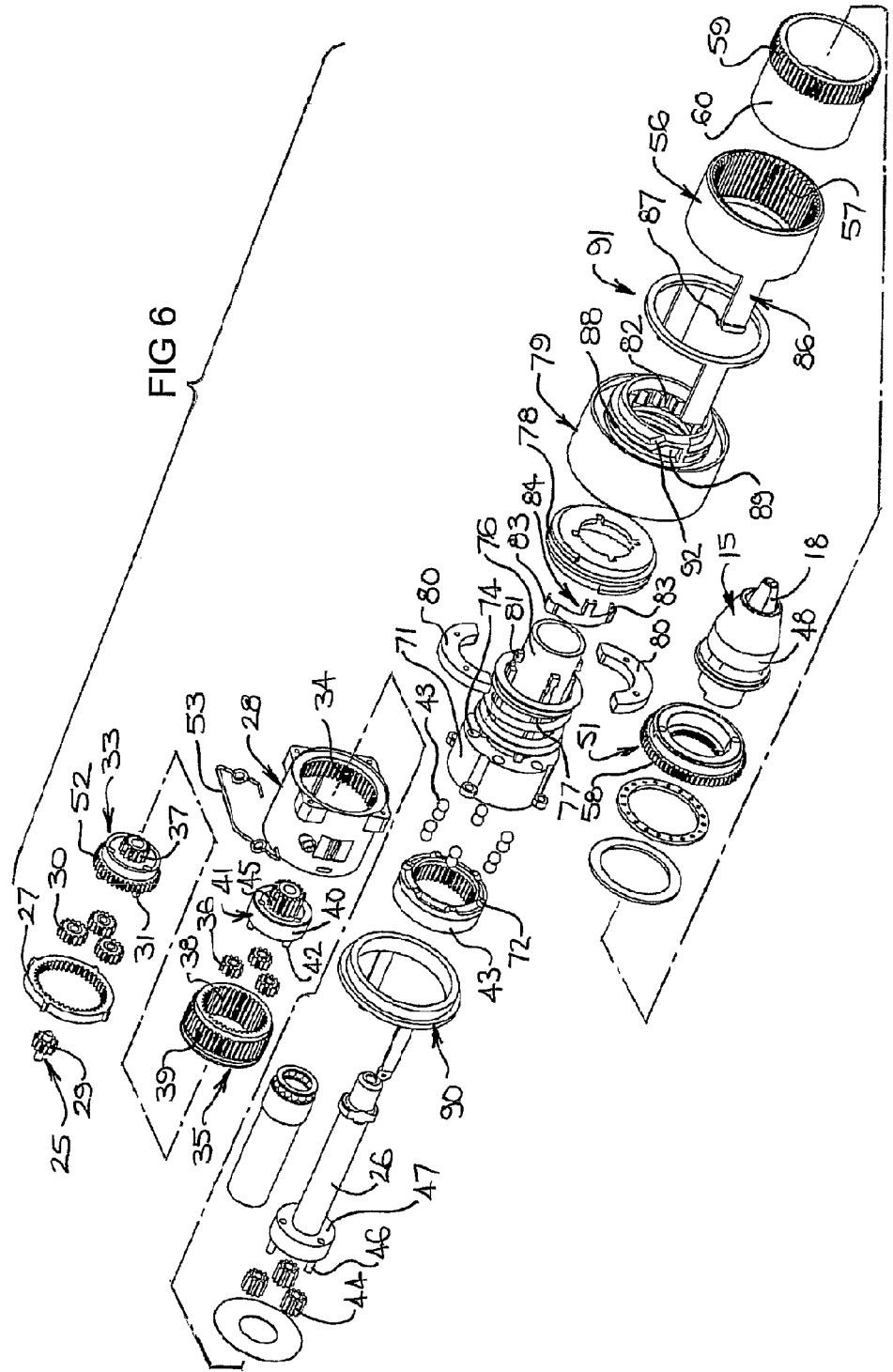
FIGS. 6 and 7 are exploded views of the gear assembly, torque control means and the driven member of a first preferred embodiment.

Referring now to FIG. 6 the annular member 79 engages a split ring 80 which is held axially of the shaft by detents extending from the outer surface of the shaft 76. The annular member 79 is rotatable relative to the shaft to axially displace the slide ring 78. The annular position of the annular member 79 is checked relative to the shaft by a ratchet assembly. The ratchet assembly is formed by the annular member having a plurality of detents 82 extending around its inner radial surface which are engaged by spring biased arms 83 of a pawl 84 connected to a rib 77 on the shaft 76. The torque control means 7 allows for adjustment of the compressional force transferred by the compressional spring 75 through the ball bearings 73 to the geared slip ring 78 to ultimately control the level of torque supplied to the driven member 15.

As stated previously the gear assembly supplies drive to the shaft 26 via the geared slip ring 43. This is correct when the geared slip ring 43 is stationary so that the planetary gears 44 can rotate relative to the geared slip ring 43. However, the geared slip ring 43 is only held stationary when the compressional force applied by the compressional spring 75 via the ball bearings 73 to the geared slip ring 43 does not exceed the torque produced by the driven member 15. Where the torque exceeds the compressional force, the shaft 26 will remain relatively stationary whilst rotation of the planetary gears 44 will cause the geared slip ring 43 to slip relative to the ball bearings 73. The alteration of the compressional force by rotation of the annular member 79 will alter the level of torque transferable to the shaft 26.

Drive can be transmitted from the output shaft 26 to the chuck 15 in any appropriate manner, and the chuck 15 can be of any suitable construction. In the particular arrangement shown in FIG. 3, the chuck 15 includes a head portion 48 that is connected to the shaft 26 and carries three jaws 18. Each jaw 18 has a gripping face 49 adapted to clamp against the shank of the working element 4 (FIG. 1), and adjustment means is provided to enable the jaws 18 to be moved as required according to the diameter of the working element 4 to be engaged.

In the particular arrangement shown, each jaw 18 is slidably mounted on the head portion 48 so as to be moveable relative to the head portion 48 along a path arranged angularly relative to the axis 6. The adjustment means includes an adjusting nut 51 rotatably mounted on the head portion 48 and meshing with each jaw 18 through a thread or worm connection 85. The arrangement is such that rotation of the nut 51 relative to the head portion 48 moves the gripping face 49 of each jaw 18 either towards or away from the axis 6.

It is preferred that the chuck 15 can be driven at either a high speed of rotation or a low speed of rotation. For that purpose, the mode selector 17 may be operable to select either the high speed mode or the low speed mode.

FIG. 3 illustrates the condition of the gear assembly 16 when the low speed mode has been selected. In that mode, the input shaft 25 drives the first input gear system 22 through rotation of the sun gear 29. In the particular arrangement shown, the planetary gear system 22 functions as a speed reduction mechanism. That is, because the planet gears 30 mesh with a fixed gear 27 and a rotating sun gear 29, the speed of rotation of the system 22 at the axis of each planet gear 30 is less than the speed of rotation of the sun gear 29. The transfer member 33 rotates at the same relatively low speed because of its connection with the system 22 through the spindles 31.

The second input system 23, when arranged as shown by FIG. 3, provides a further speed reduction because it is a planetary gear system similar to the system 22. In that regard, it is relevant that the second ring gear 35 meshes with the fixed ring gear 34, and is thereby held against rotation relative to the body 28. The planet gears 36 therefore mesh with a fixed ring gear 35 and a rotating sun gear 37, and as a consequence the speed of rotation of the system 23 at the axis of each planet gear 36 is less than the speed of rotation of the sun gear 37. The transfer member 41 rotates through the drive connection formed by the spindles 42, and therefore rotates at a speed less than that of the transfer member 33.

Further speed reduction occurs between the transfer member 41 and the output shaft 26 because those two components are connected through a planetary gear system 24 which functions in the same manner as the gear system 22. The speed reduction influence of the gear system 24 may be the same as or different to the speed reduction influence of either of the input gear systems 22 and 23, according to requirements. It will be appreciated that in some circumstances, there may not be a need for a third speed reduction, in which event the planetary gear system 24 could be omitted.

FIG. 4 shows the change in the gear assembly 16 that arises when the mode selector 17 has been operated to select the high speed mode. When that selection is made, the ring gear 35 is caused to move axially to the left so as to mesh with a pinion gear 52 and separate from the fixed ring gear 34. The pinion gear 52 forms part of or is fixed to the transfer member 33 so as to rotate with that member. As shown by FIG. 4, the ring gear 35 remains in engagement with the planet gears 36 and thereby locks those gears against rotation relative to both the sun gear 37 and the ring gear 35. The speed reduction influence of the second input system 23 is thereby removed, and in the particular arrangement shown the speed of rotation at the axis of each planet gear 36 is the same as the speed of rotation of the transfer member 33. It follows that the transfer member 41 is rotated at the same speed which is a higher speed than occurs in the arrangement as shown by FIG. 3. The gear system 24 retains its speed reduction influence, but the speed of rotation of the output shaft 26 is nevertheless higher than in the FIG. 3 arrangement.

Figure 7:
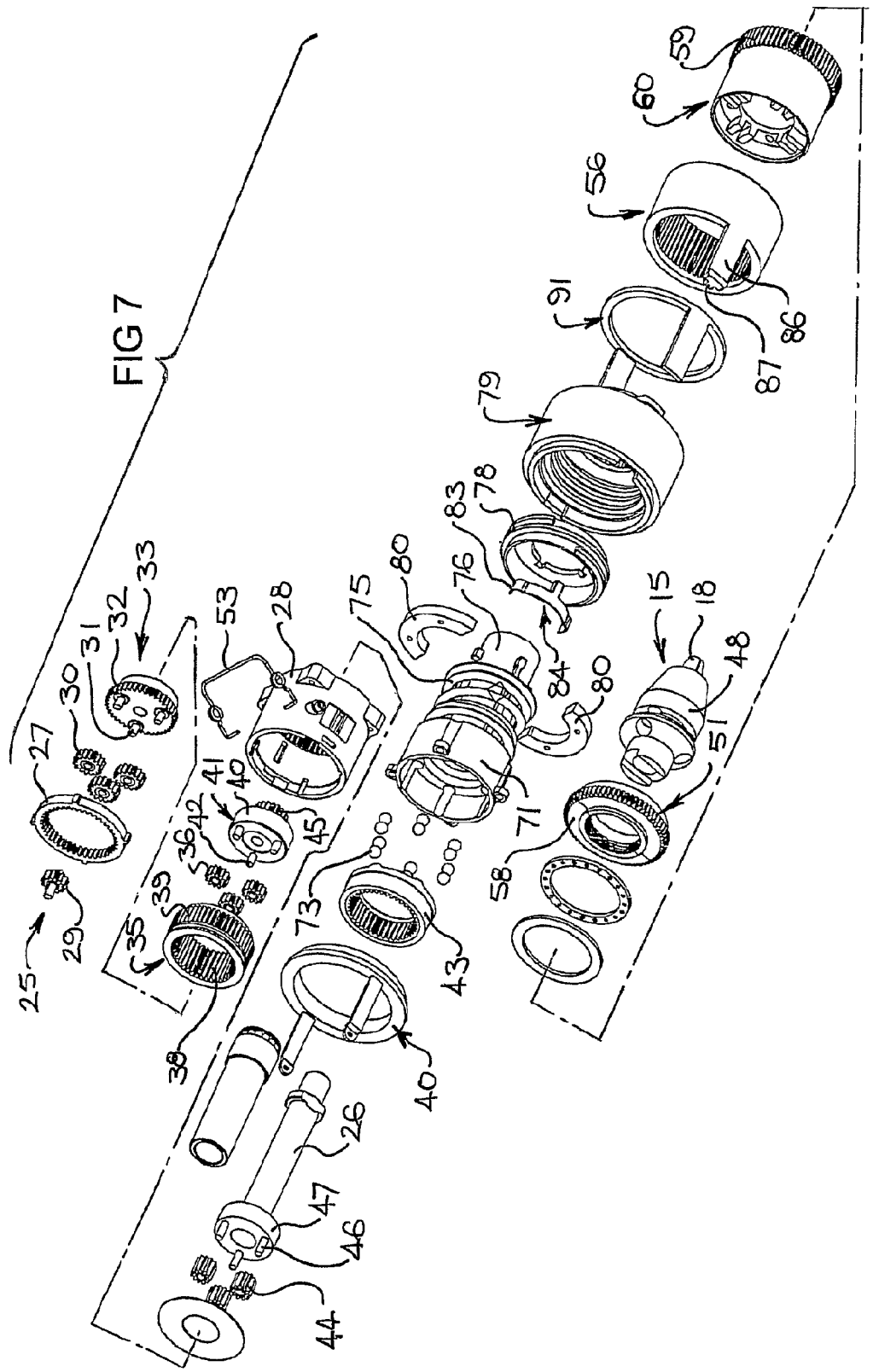

FIGS. 6 and 7 are exploded views of the gear assembly 16 as particularly described in the preceding passages of this specification.

Any suitable mechanism could be adopted to cause the ring gear 35 to move between the two positions as shown by FIGS. 3 and 4 respectively. In the particular arrangement shown, that mechanism includes a lever 53 pivotally mounted on the gear assembly body 28 and arranged to be moved about the pivot mounting by operation of the mode selector 17. The lever 53 can be connected to the ring gear 35 in any suitable manner.

It is preferred that the motor 9 is of the reversible type, and any suitable means may be adopted to enable selection of forward or reverse rotation of the chuck 15. A drive direction selector 12 may be provided at a convenient location, such as at the front end of the drill body 2 (FIG. 1).

The drill 1 illustrated is provided with means whereby adjustment of the chuck jaws 18 can be effected through operation of the motor 9. Such power adjustment of the chuck 15 can be achieved in any suitable manner, and one example arrangement will now be described by reference to FIG. 5.

In the example arrangement, locking means is provided enabling the chuck adjusting nut 51 to be releasably locked against rotation with the chuck head 48. When the nut 51 is in that locked position, forward or reverse rotation of the chuck head 48 results in coaction between the jaws 18 and the nut 51 such that the position of the jaws 18 is adjusted inward or outwards, according to the direction of the rotation of the motor 9. Various releasable locking arrangements could be adopted for the foregoing purpose. One example arrangement is shown in the accompanying drawings and is described below.

In the particular arrangement shown, a locking sleeve 56 is mounted on the gear assembly body 28 at a location within the drill body 2 adjacent the chuck 15. The sleeve 56 is mounted so as to be moveable relative to the chuck 15 in the direction of the axis 6. FIGS. 3 and 4 show the sleeve 56 in a chuck unlocked condition, and FIG. 5 show the sleeve 56 in a chuck locked position. Locking engagement between the sleeve 56 and the chuck 15 can be achieved in any suitable fashion. In the arrangement shown, the sleeve 56 is provided with an internal spline 57 that is cooperatively engageable with an external spline 58 formed on the adjustment nut 51. The sleeve 56 may be held against rotation relative to the body 28 by cooperative engagement between the spline 57 and an external spline 59 of a member 60 fixed to or forming part of the body 28. Other arrangements could be adopted to hold the sleeve 56 against rotation whilst permitting it to move in the direction of the axis 6.

The position of the sleeve 56 is adjusted by means of the mode selector 17. When using the mode selector 17, by way of example, the sleeve 56 may be connected to the ring gear 35 so as to move with that gear. Any suitable means may be adopted for that purpose one means will be described later in the specification The locked condition of the chuck nut 51 is achieved by moving the sleeve 56 to the right beyond the position shown by FIG. 3 or 4 so that the FIG. 5 position is adopted. It is preferred that the corresponding movement of the ring gear 35 is such as to leave that gear in meshing engagement with both the fixed ring gear 34 and the sun gear 37. Under those circumstances, adjustment of the chuck jaws 18 is effected while the chuck head 48 is rotating in the slow speed mode. Other arrangements could be adopted.

The means linking the sleeve 56 with ring gear 35 illustrated in FIG. 5 is associated with the annular member 79 so that operation of the mode selector 17 to select the adjustment mode is only possible when the annular member 79 is in the adjustment position. The adjustment position corresponds to a relatively low torque level, thereby reducing the likelihood of damaging the working element 4.

Referring now to FIG. 6 the locking sleeve 56 illustrated includes an axially extending arm 86 having a radially extending shoulder 87 located at a free end thereof. In the assembled state the shoulder 87 is located in an annular groove 88 formed on the radial outer surface of the annular member 79. An axially expanded pocket 89 is formed in the groove 88, the shoulder 87 being positionable in the pocket 89 when the annular member 79 is in the adjustment position. This groove 88 and pocket 89 restricts the axial movement of the locking sleeve 56 to when the annular member 79 is in the adjustment position only.

Movement of the locking sleeve 56 from an unlocked position to a locked position is effected by manipulating the selection lever 53 to move an abutment member 90 towards the chuck 15. The abutment member 90 shunts a translational member 91, which in turn engages and moves the locking sleeve 56 to the locking position. Moving the locking sleeve 56 back to the unlocked position is effected by rotation of the annular member 79 from the adjustment position. The radial shoulder 87 of the locking sleeve arm 86 engages a raked surface 92 defining in part the pocket 89 of the annular member 79. Further rotation of the annular member 79 resulting in the shoulder 87 sliding over the raked surface 92, causing the locking sleeve 56 to axially retract, shunting the translational member 91 back towards the gear box 16.

After completion of a chuck adjustment operation, the mode selector 17 can be operated to select either the low speed mode (FIG. 3) or the high speed mode (FIG. 4). As will be apparent from FIGS. 3 and 4, the sleeve 56 is separated from the chuck nut 51 in both of those situations.

Figure 8:
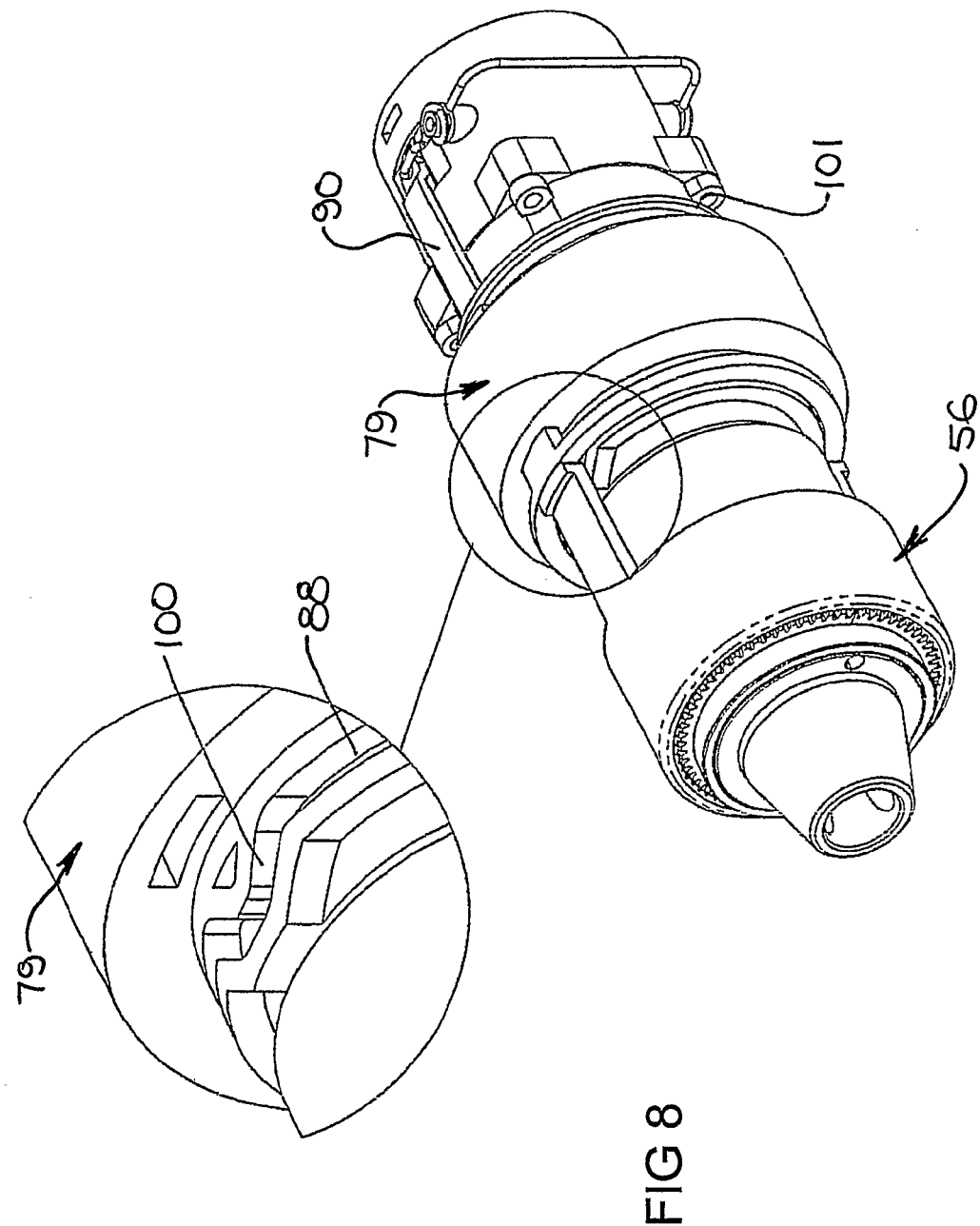
FIG. 8 is an isometric view of torque control means according to a second preferred embodiment.

Referring now to FIG. 8 which illustrates a second preferred embodiment which is designed for the power tool to automatically adopt the adjust mode when the annular member 79 is rotated to an adjust position as shown. The detail B shows the annular groove 88 of the annular member 79 includes a cam surface 100 that is engaged by shoulder 87 (shown in FIG. 9). When the annular member is rotated to the adjust position the cam surface 100 engages the shoulder 87 and causes the locking sleeve 56 to move towards the front of the power tool to engage the member 60.

Figure 9:
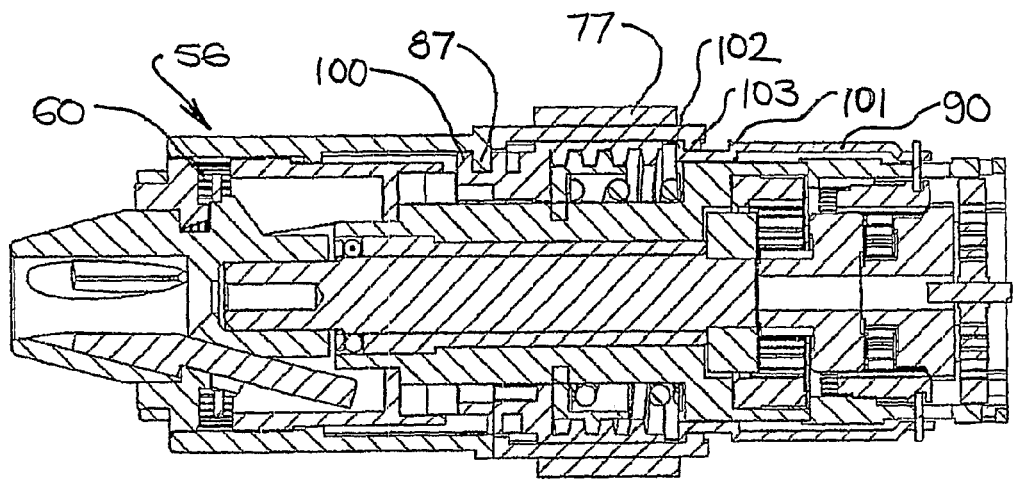
FIG. 9 is a cross section of the torque control means from FIG. 8.
Figure 10:
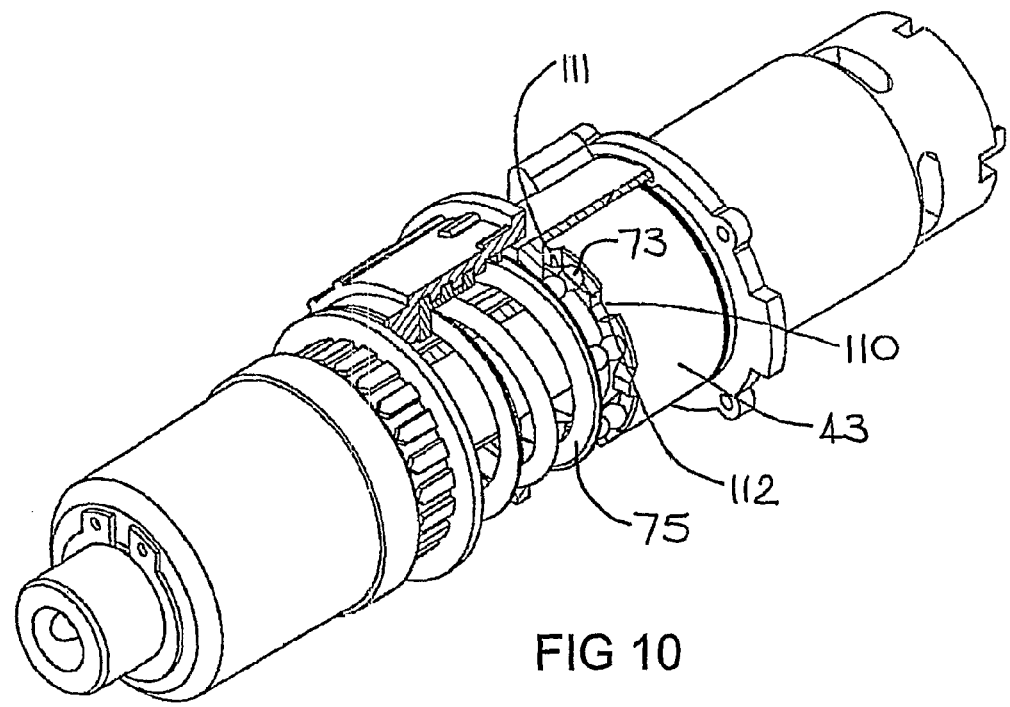
FIG. 10 is an isometric view of torque control means according to a third preferred embodiment.

Referring now to FIG. 9 the abutment member 90 include a pair of abutment surfaces 101, 102 that captures a shoulder 103 of translation member 91 while still allowing for lost motion between the abutment member 90 and the translation member 91. This allows the locking sleeve 56 to be moved from engagement with the member 60 without effecting the position of the abutment member 90 and hence the gear selected.

As mentioned above, the geared slip ring 43 includes a plurality of cups 72 located on an annular surface thereof, each cup 72 receiving one of a pair of ball bearings. The geared slip ring 43 is only held stationary when the compressional force applied by the compressional spring 75 via the ball bearings 73 to the geared slip ring 43 does not exceed the torque produced by the driven member 15. Where the torque exceeds the compressional force, the shaft 26 will remain relatively stationary whilst rotation of the planetary gears 44 will cause the geared slip ring 43 to slip relative to the ball bearings 73. The alteration of the compressional force by rotation of the annular member 79 will alter the level of torque transferable to the shaft 26.

As can be seen in FIGS. 6 and 7 the geared slip ring 43 has on its annular surface cups 72. Adjacent cups 72 are separated by a casselation 110. Each casselation has two faces 111 and 112 that are inclined relative to the annular surface of the geared slip ring 43. Each cup is, in part, defined by a face 111 and 112 of adjacent casselations 110. In the arrangement shown in FIGS. 6 and 7 the faces 111 and 112 of each casselation 110 are inclined to substantially the same degree relative to the annular surface of the geared slip ring 43. Thus, when the driven member 15 rotates in either a forward or reverse direction, for a given compressional force applied by the compressional spring 75 via the ball bearings 73 to the geared slip ring 43, the amount of torque required to overcome the compressional force such that the shaft 26 will remain relatively stationary whilst rotation of the planetary gears 44 will cause the geared slip ring 43 to slip relative to the ball bearings 73 is substantially the same. Put simply, because the faces 111 and 112 of each casselation 110 are inclined to substantially the same degree relative to the annular surface of the geared slip ring 43 the torque required in the forward or reverse direction to cause the geared slip ring 43 to slip is substantially the same.

It may be useful, however, to have differing thresholds of torque required to cause the geared slip ring 43 between the forward and reverse directions. For example, when adjustment mode has been selected for the purpose of adjusting the chuck jaws 18 it would be beneficial to have a lower torque threshold when rotating the driven member 15 in, say, the forward direction to grip the working element and a higher torque threshold when rotating the driven member 15 in the reverse direction to release the working element. This would ensure that a greater amount of torque is applied for releasing the working element than for gripping the working element thus ensuring that the chuck jaws 18 will release the working element and not become jammed.

As is shown in the third preferred embodiment of FIGS. 10, 11, 12 and 13, the faces 111 and 112 of each casselation 110 of the geared slip ring 43 are inclined to a substantially different degree relative to the annular surface of the geared slip ring 43. Thus, when the driven member 15 is rotated in one direction, say the forward direction, the less inclined casselation surface 111 engages the ball bearings 73 resulting in a relatively less amount of torque required to overcome a given compressional force applied by the compressional spring 75 via the ball bearings 73 to the geared slip ring 43. In contrast, when the driven member 15 is rotated in the opposite direction, that is the reverse direction, the more inclined casselation surface 112 engages the ball bearings 73 resulting in a relatively greater amount of torque required to overcome a given compressional force applied by the compressional spring 75 via the ball bearings 73 to the geared slip ring 43. Thus, when the adjustment mode has been selected for the purpose of adjusting the chuck jaws 18 a lower torque threshold applies when rotating the driven member 15 in, say, the forward direction to grip the working element and a higher torque threshold applies when rotating the driven member 15 in the reverse direction to release the working element. This provides a greater amount of torque applied for releasing the working element than for gripping the working element and may provide that the chuck jaws 18 will release the working element and not become jammed.

It will be apparent from the foregoing description that a power tool incorporating the invention is convenient to use. It should also be apparent that by enabling operation of the mode selector to select adjustment mode, when the torque control means has selected a relatively low torque setting, is a particular advantage that can protect elements of the tool and the working element. Other features and advantages of a power tool incorporating the invention will be apparent from the foregoing detailed description of an example embodiment of the invention.

Finally it is to be understood that various alterations, modifications and/or additions may be introduced into the constructions and arrangements of parts previously described without departing from the spirit or ambit of the invention as defined in the accompanying claims.

The claims defining the invention are as follows:

1. A power tool comprising: a driven member that is operable to grip and drive at least one working element; a trigger; a mode selector movable between a first position defined as a working mode and a second position defined as an adjustment mode; drive means operable to drive the driven member about an axis, in the working mode to enable the working element to perform work, and the drive means operable to drive the driven member relative to the axis in the adjustment mode to enable the working element to be alternatively gripped or released by the driven member; mechanical torque control means alone controlling the torque transmitted from the drive means to the driven member, the mechanical torque control means including a plurality of torque control settings wherein the mechanical torque control means is operable to render the drive means inoperable to drive the driven member when the torque exceeds a pre-determined level, wherein each torque control setting corresponds to a different pre-determined torque level; the mechanical torque control means having an adjustment setting whereby the adjustment setting corresponds to a predetermined level of torque in the adjustment mode that is lower than a highest predetermined level of torque available in the work mode.

2. A power tool according to claim 1, wherein the torque control means is operable to set a range of torque settings corresponding to a range of levels of torque.

3. A power tool according to claim 1, wherein said mode selector is operable to switch between the work and adjustment modes of operation when the torque control means is in the adjustment setting only.

4. A power tool according to claim 3, wherein the driven member includes a body part and an adjustment part, the body part when driven by the drive means is rotated about a longitudinal axis, when in the adjustment mode the body part is rotated relative to the adjustment part to alternatively grip or release the working element, and the body part and adjustment part move together when in the working mode.

5. A power tool according to claim 1, wherein when the power tool is in the adjustment mode and the drive means rotates in a direction for gripping the working element the torque control means renders the drive means inoperable at a relatively lower torque level and when the drive means rotates in a direction for releasing the working element the torque control means renders the drive means inoperable at a relatively higher torque level.

6. A power tool according to claim 5 wherein the torque control means includes a geared slip ring having an annular surface with spaced apart casselations defining cups therebetween, each casselation having two surfaces inclined to a substantially different degree relative to the annular surface of the geared slip ring for when the drive means rotates in the direction for gripping the working element the less inclined casselation surface engages a compression means and provides for a relatively less amount of torque required to overcome a given compressional force applied by the compression means to render the drive means inoperable and for when the drive means rotates in the direction for releasing the working element the more inclined casselation surface engages the compression means and provides for a relatively greater amount of torque required to overcome a given compressional force applied by the compression means to render the drive means inoperable.

7. A power tool according to claim 1, wherein the mode selector is operable to switch between the work and adjustment modes of operation when the torque control means is in the adjustment setting only.

8. A power tool according to claim 1, wherein the power tool automatically adopts the adjustment mode when the adjustment setting is selected on the torque control means.

9. A power tool comprising: a driven member that is operable to grip and drive at least one working element; a motor operable to drive the driven member a trigger; a mode selector movable between a first position defining a working mode and a second position defining an adjustment mode; wherein the motor is operable to drive the driven member about an axis in the working mode to perform work, and the motor is operable to drive the driven member relative to the axis in the adjustment mode to enable the working element to be alternatively gripped or released by the driven member; a mechanical torque controller alone controlling the torque transmitted from the motor to the driven member, the mechanical torque controller including a plurality of torque control settings wherein the mechanical torque controller is operable to render the motor inoperable to drive the driven member when the torque exceeds a pre-determined level, wherein each torque control setting corresponds to a different pre-determined torque level, the mechanical torque controller having an adjustment setting which must be selected to enable the power tool to operate in the adjustment mode whereby the adjustment setting corresponds to a predetermined level of torque in the adjustment mode that is lower than a highest predetermined level of torque available in the work mode.

10. A power tool according to claim 9, wherein the torque controller is operable to set a range of torque settings corresponding to a range of levels of torque.

11. A power tool according to claim 10, wherein the mode selector is operable to switch between the work and adjustment modes of operation when the torque controller is in the adjustment setting only.

12. A power tool according to claim 11, wherein the adjustment setting corresponds to a relatively low level of torque.

13. A power tool according to claim 12, wherein the driven member includes a body part and an adjustment part, the body part when driven by the motor is rotated about a longitudinal axis, when in the adjustment mode the body part is rotated relative to the adjustment part to alternatively grip or release the working element, and the body part and adjustment part move together when in the working mode.

14. A power tool according to claim 13, wherein the power tool includes locking means operable to engage the adjustment part to thereby enable the body and adjustment parts to rotate relative to one another when the power tool is in the adjustment mode of operation.

15. A power tool according to claim 14, wherein the locking means includes a locking sleeve being movable in a longitudinal direction to engage with or disengage from the adjustment part.

16. A power tool according to claim 9, further comprising a gear assembly, wherein the gear assembly engages a shaft connected to the driven member and a geared slip ring of the torque controller, wherein when operable the motor rotates the shaft and when rendered inoperable by the torque controller rotates the geared slip ring.

17. A power tool according to claim 9, wherein when the power tool is in the adjustment mode and the motor rotates in a direction for gripping the working element the torque controller renders the motor inoperable at a relatively lower torque level and when the motor rotates in a direction for releasing the working element the torque controller renders the motor inoperable at a relatively higher torque level.

18. A power tool according to claim 17, wherein the torque controller includes a geared slip ring having an annular surface with spaced apart casselations defining cups therebetween, each casselation having two surfaces inclined to a substantially different degree relative to the annular surface of the geared slip ring for when the motor rotates in the direction for gripping the working element the less inclined casselation surface engages a compression means and provides for a relatively less amount of torque required to overcome a given compressional force applied by the compression means to render the motor inoperable and for when the motor rotates in the direction for releasing the working element the more inclined casselation surface engages the compression means and provides for a relatively greater amount of torque required to overcome a given compressional force applied by the compression means to render the motor inoperable.

19. A power tool according to claim 18, wherein the compression means includes ball bearings that are movable in an axial direction relative to the geared slip ring and are urged by a compressional spring into engagement with the cups and the casselations on the annular surface of the geared slip ring wherein when the motor rotates in the direction for gripping the working element the less inclined casselation surfaces engage the ball bearings and requires a relatively less amount of torque to urge the ball bearings in an axial direction to overcome a given compressional force applied by the compressional spring to render the motor inoperable and when the motor rotates in the direction for releasing the working element the more inclined casselation surfaces engage the ball bearings and requires a relatively greater amount of torque to urge the ball bearings in an axial direction to overcome a given compressional force applied by the compressional spring to render the motor inoperable.

20. A power tool comprising: a driven member that is operable to grip and drive at least one working element; a trigger; a mode selector movable between a first position defined as a working mode and a second position defined as an adjustment mode; drive means operable to drive the driven member about an axis, in the working mode to enable the working element to perform work, and the drive means operable to drive the driven member relative to the axis in the adjustment mode to enable the working element to be alternatively gripped or released by the driven member; mechanical torque control means alone controlling the torque transmitted from the drive means to the driven member, the mechanical torque control means including a plurality of torque control settings wherein the mechanical torque control means is operable to render the drive means inoperable to drive the driven member when the torque exceeds a pre-determined level, wherein each torque control setting corresponds to a different pre-determined torque level; the mechanical torque control means having an adjustment setting whereby the adjustment setting corresponds to a level of torque in an adjustment range, the adjustment range extending from a low level of adjustment torque at a low end of the adjustment range to a high level of adjustment torque at a high end of the adjustment range, the working mode corresponds to a level of torque in a work range, the work range extending from a low level of work torque at a low end of the work range to a high level of work torque at a high end of the work range, the high level of work torque being greater than the high level of adjustment torque.

21. A power tool according to claim 20, wherein the torque control means is operable to set a range of torque settings corresponding to a range of levels of torque.

22. A power tool according to claim 21, wherein the mode selector operable to switch between the work and adjustment modes of operation when the torque control means is in the adjustment setting only.

23. A power tool according to claim 22, wherein the driven member includes a body part and an adjustment part, the body part when driven by the drive means is rotated about a longitudinal axis, when in the adjustment mode the body part is rotated relative to the adjustment part to alternatively grip or release the working element, and the body part and adjustment part move together when in the working mode.

24. A power tool according to claim 20, wherein when the power tool is in the adjustment mode and the drive means rotates in a direction for gripping the working element the torque control means renders the drive means inoperable at a relatively lower torque level and when the drive means rotates in a direction for releasing the working element the torque control means renders the drive means inoperable at a relatively higher torque level.

25. A power tool according to claim 24, wherein the torque control means includes a geared slip ring having an annular surface with spaced apart casselations defining cups therebetween, each casselation having two surfaces inclined to a substantially different degree relative to the annular surface of the geared slip ring for when the drive means rotates in the direction for gripping the working element the less inclined casselation surface engages a compression means and provides for a relatively less amount of torque required to overcome a given compressional force applied by the compression means to render the drive means inoperable and for when the drive means rotates in the direction for releasing the working element the more inclined casselation surface engages the compression means and provides for a relatively greater amount of torque required to overcome a given compressional force applied by the compression means to render the drive means inoperable.

26. A power tool according to claim 20, wherein the mode selector is operable to switch between work and adjustment modes of operation when the torque control means is in the adjustment setting only.

27. A power tool according to claim 20, wherein the power tool automatically adopts the adjustment mode when the adjustment setting is selected on the torque control means.

28. A power tool comprising: a driven member that is operable to grip and drive at least one working element; a motor operable to drive the driven member a trigger; a mode selector movable between a first position defining a working mode and a second position defining an adjustment mode; wherein the motor is operable to drive the driven member about an axis in the working mode to perform work, and the motor is operable to drive the driven member relative to the axis in the adjustment mode to enable the working element to be alternatively gripped or released by the driven member; a mechanical torque controller alone controlling the torque transmitted from the motor to the driven member, the mechanical torque controller including a plurality of torque control settings wherein the mechanical torque controller is operable to render the motor inoperable to drive the driven member when the torque exceeds a pre-determined level, wherein each torque control setting corresponds to a different pre-determined torque level, the mechanical torque controller having an adjustment setting which must be selected to enable the power tool to operate in the adjustment mode whereby the adjustment setting corresponds to a level of torque in an adjustment range, the adjustment range extending from a low level of adjustment torque at a low end of the adjustment range to a high level of adjustment torque at a high end of the adjustment range, the working mode corresponds to a level of torque in a work range, the work range extending from a low level of work torque at a low end of the work range to a high level of work torque at a high end of the work range, the high level of work torque being greater than the high level of adjustment torque.

29. A power tool according to claim 28, wherein the torque controller is operable to set a range of torque settings corresponding to a range of levels of torque.

30. A power tool according to claim 29, wherein the mode selector operable to switch between the work and adjustment modes of operation when the torque controller is in the adjustment setting only.

31. A power tool according to claim 30, wherein the adjustment setting corresponds to a relatively low level of torque.

32. A power tool according to claim 31, wherein the driven member includes a body part and an adjustment part, the body part when driven by the motor is rotated about a longitudinal axis, when in the adjustment mode the body part is rotated relative to the adjustment part to alternatively grip or release the working element, and the body part and adjustment part move together when in the working mode.

33. A power tool according to claim 32, wherein the power tool includes locking means operable to engage the adjustment part to thereby enable the body and adjustment parts to rotate relative to one another when the power tool is in the adjustment mode of operation.

34. A power tool according to claim 33, wherein the locking means includes a locking sleeve being movable in a longitudinal direction to engage with or disengage from the adjustment part.

35. A power tool according to claim 28, further comprising a gear assembly, wherein the gear assembly engages a shaft connected to the driven member and a geared slip ring of the torque controller, wherein when operable the motor rotates the shaft and when rendered inoperable by the torque controller rotates the geared slip ring.

36. A power tool according to claim 28, wherein when the power tool is in the adjustment mode and the motor rotates in a direction for gripping the working element the torque controller renders the motor inoperable at a relatively lower torque level and when the motor rotates in a direction for releasing the working element the torque controller renders the motor inoperable at a relatively higher torque level.

37. A power tool according to claim 36, wherein the torque controller includes a geared slip ring having an annular surface with spaced apart casselations defining cups therebetween, each casselation having two surfaces inclined to a substantially different degree relative to the annular surface of the geared slip ring for when the motor rotates in the direction for gripping the working element the less inclined casselation surface engages a compression means and provides for a relatively less amount of torque required to overcome a given compressional force applied by the compression means to render the motor inoperable and for when the motor rotates in the direction for releasing the working element the more inclined casselation surface engages the compression means and provides for a relatively greater amount of torque required to overcome a given compressional force applied by the compression means to render the motor inoperable.

38. A power tool according to claim 37, wherein the compression means includes ball bearings that are movable in an axial direction relative to the geared slip ring and are urged by a compressional spring into engagement with the cups and the casselations on the annular surface of the geared slip ring wherein when the motor rotates in the direction for gripping the working element the less inclined casselation surfaces engage the ball bearings and requires a relatively less amount of torque to urge the ball bearings in an axial direction to overcome a given compressional force applied by the compressional spring to render the motor inoperable and when the motor rotates in the direction for releasing the working element the more inclined casselation surfaces engage the ball bearings and requires a relatively greater amount of torque to urge the ball bearings in an axial direction to overcome a given compressional force applied by the compressional spring to render the motor inoperable.

* * * * *